United States Patent Office 3,636,031
Patented Jan. 18, 1972

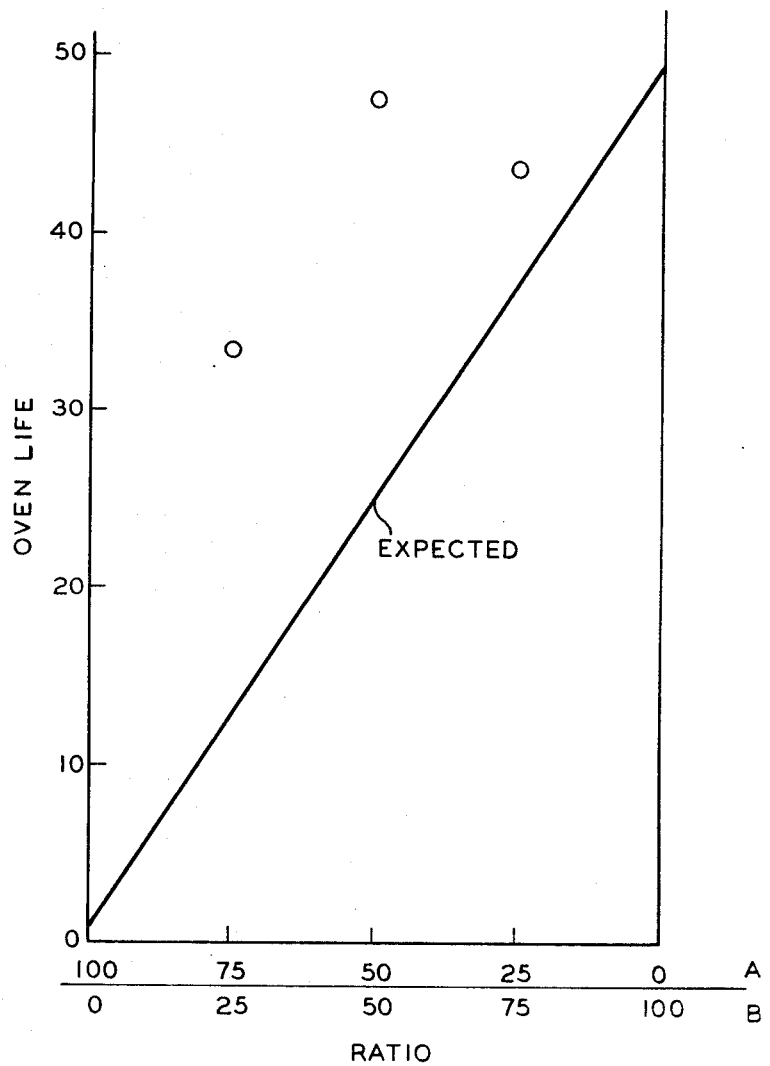

3,636,031
ANTIOXIDANT SYSTEM FOR POLYOLEFINS
William O. Drake and Kenneth R. Mills, Bartlesville, Okla., assignors to Phillips Petroleum Company
Continuation-in-part of application Ser. No. 570,459, Aug. 5, 1966. This application July 24, 1969, Ser. No. 844,642
Int. Cl. C08f 45/60
U.S. Cl. 260—45.8 N          12 Claims

ABSTRACT OF THE DISCLOSURE

A stabilizer system for poly 1-olefins comprising an organic phosphite ester, a thioester, 2,6-di-tert-butyl-4-methylphenol, and 4,6-di(4-hydroxy-3,5-di-tert-butylphenoxy)-2-octylthio-1,3,5-triazine.

CROSS REFERENCES TO RELATED APPLICATIONS

This application is a continuation-in-part of Ser. No. 570,459, filed Aug. 5, 1966 now abandoned.

FIELD OF THE INVENTION

This invention relates to a stabilizer combination useful in the stabilization of polymers of 1-olefins having 2 to 8 carbon atoms against deterioration in physical properties as a result of exposure to light and air, particularly at elevated temperatures and over long periods of time. One aspect of this invention is to provide a stabilizer system comprising 2,6 - di - tert - butyl - 4 - methylphenol, dioctyl phosphite, dilaurylthiodipropionate and 4,6 - di(4 - hydroxy - 3,5 - di - t - butylphenoxy) - 2 - octylthio - 1,3,5-triazine—hereinafter sometimes referred to as "the substituted triazine."

It is to be understood that the term "polymers of 1-olefins" or "poly-1-olefins" used hereinafter in the specification and the claims includes homopolymers, copolymers, terpolymers and quaternary polymers of these 1-olefins. These polymers can also contain not more than 10 percent of the other copolymerizable monomers.

Polypropylene will be used as a nonlimiting example of a 1-olefin polymer with which the stabilizer combination of the invention can be used. It is a tough, high-melting polymeric material, but in several respects its stability leaves much to be desired. The polymer shows a tendency to decrease rapidly in melt viscosity and then to become brittle when kept at elevated temperatures for the time required in milling and calendering, or in extruding, injection molding, or fiber forming equipment. This deterioration is particularly serious when the polymer is worked in the molten state in the presence of oxygen, e.g. air. Shaped polymers prepared in such equipment show a tendency to discolor, to crack, and to powder around the edges upon exposure to sunlight. When the polymer or shaped polymer is heated at elevated temperatures, really an accelerated aging process, the problem is especially accentuated.

To meet commercial requirements, it is of course quite important that the polymer retain its physical properties during processing and thereafter. However, great difficulty has been experienced in achieving the necessary stabilization. In all probability the changes leading to this deterioration in physical properties arise from chemical modification of the polymer. Whether this modification is due to oxidation or to some other effect is not yet known. Lack of such knowledge has naturally hindered the development of satisfactory stabilizers.

DESCRIPTION OF THE PRIOR ART

Considerable research over the past few years to solve these problems of deterioration has led to the suggestion of a variety of stabilizers to counteract one or more of these difficulties. Most polypropylene on the market today contains one or more of these stabilizers. However, no stabilizer or combination of stabilizers has yet been disclosed which is capable of eliminating or minimizing all of the stabilization problems. While it is now possible to stabilize polypropylene fairly well against deterioration in melt viscosity, this stabilization is not always accompanied by an inhibition of deterioration in other respects, such as embrittlement and discoloration at elevated temperatures. Stabilizers which can eliminate or reduce embrittlement are often not capable of preventing discoloration, or reduction in melt viscosity. In addition the retention of the polymer's physical properties over long periods of time is particularly difficult to achieve.

Logically, it would seem that if one stabilizer does not do the entire job, a combination should. Groups of stabilizers, called "stabilizer systems" have been proposed; however, the effect of a plurality of stabilizers is impossible to predict from their effects individually, because the possible effects multiply with the number of stabilizers in the system. Stabilizers to be effective at all must be reactive, and thus can react with each other as well as with polypropylene and with whatever else leads to the deterioration. The various stabilizers thus can and do introduce unpredictable and undesirable side effects by reactions among themselves, and combinations of stabilizers that are capable of improving resistance to deterioration in some ways can actually offset the individual effects and increase the rate of deterioration in that or in other respects. This can be due to one stabilizer effecting the desired improvement, another stabilizer reacting with and removing the first, and the reaction products accelerating the deterioration. Under such circumstances, developing a stabilizer system capable of producing a polypropylene that has a good overall resistance to all of the deteriorative tendencies is obviously quite a complex problem.

In a copending application Ser. No. 266,012, now U.S. Pat. 3,258,418, and in which one of the present applicants, Kenneth R. Mills, is a coapplicant along with Arthur A. Harban, there is disclosed a stabilizer system which is a combination of three stabilizers comprising a phenolic material, an organic phosphite and a thioester. This stabilizer system prevents the formation of voids in films or filaments of a polymer of a monoolefin.

In another copending application, Ser. No. 570,458, now U.S. Pat. 3,409,587, which one of the present applicants, Kenneth R. Mills, is the sole applicant, there is disclosed a stabilizer system which is a combination of four stabilizers comprising an organic phosphite compound, a thioester, a specific phenolic material, and a second specific phenolic material which is selected from the group consisting of 1,1,3 - tris(2 - methyl - 4 - hydroxy - 5 - tert-butylphenyl)-butane and tetrakis[3 - (3,5 - di - tert - butyl-4 - hydroxyphenyl)propionyloxymethyl] - methane. This stabilizer system possesses a stabilizing action distinctly superior to that which could be expected from the sum of the actions of the two phenolic materials in the presence of the phosphite and thioester.

SUMMARY OF THE INVENTION

It has now been surprisingly discovered that employment of the substituted triazine compound in combination with 2,6 - di - tert - butyl - 4 - methylphenol in the presence of an organic phosphite and a thioester also produces a stabilizing action superior to that expected from the sum of the actions of the phenolic and triazine materials in the presence of the phosphite and thioester.

In accordance with this instant invention, a stabilizer system is provided which not only improves the resistance of the polymer to discoloration but also improves the resistance of the polymer to embrittlement upon exposure to air and light at normal atmospheric and at elevated temperatures, particularly over long periods of time.

Therefore it is an object of this invention to provide a stabilizer system comprising an organic phosphite, a thioester, 2,6 - di - tert - butyl - 4 - methylphenol and 4,6-di(4 - hydroxy - 3,5 - di - t - butylphenoxy) - 2 - octylthio-1,3,5-triazine.

Another object of this invention is to provide a stabilized polymer of a 1-olefin having from 2 to 8 carbon atoms by incorporating therewith a stabilizer system comprising dialkylphosphite, dilaurylthiodipropionate, 2,6 - di - tert-butyl - 4 - methylphenol and 4,6 - di(4 - hydroxy - 3,5-di-t-butylphenoxy)-2-octylthio-1,3,5-triazine.

Other objects and many of the attendant advantages of this invention wil be readily appreciated as the same becomes better understood by reference to the following detailed description which is considered in connection with the accompanying drawing wherein:

BRIEF DESCRIPTION OF THE DRAWING

The sole figure graphically illustrates the synergistic effect obtained in stabilizing a 1-olefin polymer against embrittlement by using the improved stabilizer system described in greater detail hereinafter.

DETAILED DESCRIPTION OF THE INVENTION

Broadly this invention comprises a process for stabilizing a polymer of a 1-olefin containing from 2 to 8 carbon atoms against deterioration, said process comprising the step of contacting said polymer with a stabilizing system comprising a phosphite ester characterized by the structural formula:

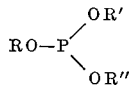

wherein R is a hydrocarbon radical selected from the group consisting of alkyl, aryl, cycloalkyl, and combinations thereof such as alkaryl and aralkyl, having 1 to 20 carbon atoms, and R' and R" are selected from the group consisting of R and hydrogen; a thioester characterized by the structural formula:

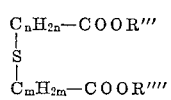

wherein R''' and R'''' are alkyl groups containing 6 to 24 carbon atoms, and $n$ and $m$ are integers from 1 to 6, preferably 2; 2,6-di-tert-butyl-4-methylphenol, [commercially available under a number of trade names such as Ionol, Tenox BHT, and Dalpac R]; 4,6-di(4-hydroxy-3,5-di-t-butylphenoxy)-2-octylthio-1,3,5-triazine.

Exemplary organic phosphite esters are: monomethylphosphite, trimethyl phosphite, trieicosyl phosphite, di-2-ethylhexyl phosphite, diphenyl 2-ethylhexyl phosphite, dibutyl phosphite, di-isooctyl tolyl phosphite, tri-2-ethylhexyl phosphite, phenyl dicyclohexyl phosphite, phenyl diethyl phosphite, triphenyl phosphite, octyl phosphite, isobutyl phosphite, tricresyl phosphite, tri(2,3-dimethylphenyl) phosphite, trioctadecyl phosphite, phenyl phosphite, dioctyl phosphite (DOPI), triisooctyl phosphite, tridodecyl phosphite, isooctyl diphenyl phosphite, diisooctyl phenyl phosphite, tri(2-octylphenyl) phosphite, tri-(3-nonylphenyl) phosphite, dicyclohexyl phosphite, benzyl methyl isopropyl phosphite, butyl dicresyl phosphite, isooctyl di(2-octylphenyl) phosphite, di(2-ethylhexyl) 3-isooctylphenyl phosphite, tri(2-cyclohexylphenyl) phosphite, tri-1-naphthyl phosphite, tri(3-phenylphenyl) phosphite, tri(2-phenylethyl) phosphite, tridodecyl phosphite, tri-4-tert-butylphenyl phosphite, dodecyl diphenyl phosphite and 4-tert-butylphenyl di-2-ethylhexyl phosphite.

Exemplary thioester compounds are: laurylhexylthiodipropionate, dilaurylthiodipropionate (DLTDP), butylstearylthiodipropionate, 2 - ethylhexyllaurylthiodipropionate, di - 2 - ethylhexylthiodipropionate, diisodecylthiodipropionate, isodecyltetradecylthiodiheptanoate, laurylstearylthiodipropionate, distearylthiodipropionate, hexyltetracosylthiodiacetate, octyltetradecylthiodibutyrate, heptylheptadecylthiodiheptanoate, the 1 - lauryl-8 - stearyl diester of 4 - thiaoctanedioic acid, the 1-hexyl-10-tetracosyl diester of 3-thiadecanedioic acid, and the like.

A sufficient amount of the stabilizer combination is used to improve the stability of the polymer against deterioration of physical properties, including discoloration and embrittlement under the conditions to which the polymer, i.e. polypropylene, will be subjected. Very small amounts are usually adequate, amounts within the range from about 0.15 to 3.50, preferably 0.5 to 2.5, parts by weight of the stabilizer composition per 100 parts polymer (php.) are employed for optimum stabilization. Preferably, the 2,6-di-tert-butyl-4-methylphenol and the 4,6-di-(4-hydroxy-3,5-di-tert-butylphenoxy)-2-octylthio - 1,3,5-triazine are each present in a range from about 0.025 to about 0.5 part by weight per 100 parts of polymer (php.), and the organic phosphite and thioester are each present in the range of from about 0.05 to about 1.25 php. Excellent results have been obtained with ratios of the 2,6-di-tert-butyl-4-methylphenol to the substituted triazine of the stabilizer system within the range of about 90:10 to about 10:90, and a range of about 30:10 to about 10:30.

The stabilizer system of the subject invention can be formulated as a simple mixture for incorporation in the polymer. An inert organic solvent can be used to facilitate handling, if the ingredients do not form a homogeneous mixture or solution. Incorporation into the polymer can be by simple blending, by spraying of a solution of the stabilizers on the polymer followed by drying, or by other means known to the industry.

The poly-1-olefins with which the stabilizer system of the invention can be used are any of those known to the industry, and can be made, for example, by the so-called high-pressure process, by the low-pressure process of U.S. 2,825,721, or by the use of any of the known organometal catalyst systems. Examples of other copolymerizable monomers which can be present in the copolymer are butadiene, vinyl acetate, isoprene and the like. It is also within the scope of the invention to add other materials to the mixture of polyolefin and stabilizer—e.g., plasticizing agents, lubricants, dyes, fillers, pigments, curing agents, antistatic agents, and the like. However, the antioxidant system of the invention is applicable to a polymer made by any of the processes known to the industry. It is particularly applicable to polymer parts that are to be used in dishwashers, washing machines, hot water tanks and the like, i.e. in applications where resistance to heat and to water extraction of antioxidants are factors.

The stabilizing effect of the stabilizer system on polypropylene was evaluated in the following example and is graphically demonstrated in the drawing based on the data of Example I. By examination of the straight line connecting the oven life data for runs 1 and 5, it will be seen that for any concentration there is an unexpected improvement obtained by the use of the particular substituted triazine in addition to the specific phenolic compound in combination with a phosphite ester and thioester. In the table and drawing (A) represents the 2,6-di-tert-butyl-4-methylphenol and (B) represents 4,6-di(4-hydroxy - 3,5 - di-tert-butylphenoxy) - 2-octylthio-1,3,5-triazine.

EXAMPLE I

Polypropylene prepared by mass polymerization of propylene (in the presence of a catalyst system comprising diethylaluminum chloride and the reaction product formed on mixing titanium tetrachloride and aluminum, said product having the approximate formula TiCl$_3$-⅓ AlCl$_3$) was treated with the four-component stabilizer system of this invention. All additives were introduced as 1 percent acetone solutions. After evaporation of the solvent accompanied by occasional stirring, the mixtures were blended in the plastograph for ten minutes under nitrogen at 190° C. and 60 r.p.m.

After blending, the formulations were molded into 20 mil sheets of 217° C. Sheets were then cut into 0.25 x 1.75" strips and five specimens of each sample were placed in the 150° C. forced air oven. Any crazing, spotting or crumbling of the specimens was classified as a failure. The oven embrittlement resistance was based on the average time in days for the second, third and fourth specimens to fail.

The amount of the A compound to the B compound in this example was from 0.3:0.1 to 0.1:0.3. All samples in Example I contained 0.3 php. dilaurylthiodipropionate and 0.1 php. of dioctyl phosphite.

TABLE I

| Sample Number: | Php.[1] | | Oven life, days | |
|---|---|---|---|---|
| | A[2] | B[3] | Found | Expected |
| 1 | 0.4 | 0.0 | <1 | |
| 2 | 0.3 | 0.1 | 33 | <13.25 |
| 3 | 0.2 | 0.2 | 47 | <25.5 |
| 4 | 0.1 | 0.3 | 43 | <37.75 |
| 5 | 0.0 | 0.4 | 49 | |

[1] Parts by weight per 100 parts polymer.
[2] 2,6-di-tert-butyl-4-methylphenol.
[3] 4,6-di(4-hydroxy-3,5-di-tert-butylphenoxy)-2-octylthio-1,3,5-triazine.

It can be readily seen that a synergistic improvement in oven life is obtained using a combination of the substituted triazine and the 2,6-di-tert-butyl-4-methylphenol.

EXAMPLE II

In accordance with the procedure as set forth in Example I above, stabilized polypropylene samples were prepared by incorporating into the polymer samples the same A compound and B compound, 0.3 php. of distearylthiodipropionate and 0.1 php. of triphenylphosphite. The amount of the A compound to the B compound in this example was varied from 0.04:0.36 to 0.36:0.04. The results are summarized in Table II.

TABLE II

| Sample Number: | Php.[1] | | Oven life, days | |
|---|---|---|---|---|
| | A[2] | B[3] | Found | Expected |
| 6 | 0.00 | 0.40 | 61 | |
| 7 | 0.04 | 0.36 | 88 | 55 |
| 8 | 0.10 | 0.30 | 94 | 46 |
| 9 | 0.20 | 0.20 | 74 | 31 |
| 10 | 0.30 | 0.10 | 83 | 16 |
| 11 | 0.36 | 0.04 | 59 | 7 |
| 12 | 0.40 | 0.00 | <1 | |

[1] Parts by weight per 100 parts polymer.
[2] 2,6-di-tert-butyl-4-methylphenol.
[3] 4,6-di(4-hydroxy-3,5-di-tert-butylphenoxy)-2-octylthio-1,3,5-triazine.

The above example demonstrates that unexpected results are still obtained for each sample using the A compound and B compound in combination with a different thioester and a different organic phosphite ester.

EXAMPLE III

In accordance with the procedure as set forth in Example I stabilized polypropylene samples were prepared by incorporating into the polymer samples the A compound and the B compound in amounts as utilized in Example II. The thioester in these experiments was 0.3 php. distearylthiodipropionate and the organic phosphite ester was tris-nonylphenylphosphite, a mixture of mono- and di-substituted phosphite esters obtained from the Weston Chemical Corporation. The results are summarized in Table III.

TABLE III

| Sample Number: | Php.[1] | | Oven life, days | |
|---|---|---|---|---|
| | A[2] | B[3] | Found | Expected |
| 13 | 0.00 | 0.40 | 103 | |
| 14 | 0.04 | 0.36 | 107 | 93 |
| 15 | 0.10 | 0.30 | 104 | 78 |
| 16 | 0.20 | 0.20 | 98 | 92 |
| 17 | 0.30 | 0.10 | 84 | 27 |
| 18 | 0.36 | 0.04 | 61 | 10 |
| 19 | 0.40 | 0.00 | <1 | |

[1] Parts by weight per 100 parts polymer.
[2] 2,6-di-tert-butyl-4-methylphenol.
[3] 4,6-di(4-hydroxy-3,5-di-tert-butylphenoxy)-2-octylthio-1,3,5-triazine.

The above run once again demonstrates that a different combination of a thioester and an organic phosphite provides unexpected results for each sample when used with the specific combination of the A compound and the B compound.

What is claimed is:

1. A stabilizer system for use in improving resistance of poly 1-olefins prepared from 1-olefin monomers having 2 to 8 carbon atoms therein to deterioration in physical properties on exposure to light and heat, comprising an organic phosphite ester characterized by the following formula:

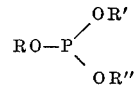

wherein R is a hydrocarbon radical selected from the group consisting of alkyl, aryl, cycloalkyl, and combinations thereof having 1 to 20 carbon atoms, and R' and R" are selected from the group consisting of R and hydrogen; a thioester characterized by the formula:

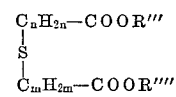

wherein R''' and R'''' are alkyl groups selected from those containing 6 to 24 carbon atoms, and $n$ and $m$ are integers from 1 to 6; 2,6-di-tert-butyl-4-methylphenol; and 4,6-di(4-hydroxy-3,5-di-tert-butylphenoxy) - 2 - octylthio - 1, 3,5-triazine.

2. A stabilizer system according to claim 1 in which the organic phosphite ester is dioctyl phosphite and the thioester is dilaurylthiodipropionate.

3. A stabilizer system according to claim 1 wherein the thioester is distearylthiodipropionate and the organic phosphite ester is triphenylphosphite.

4. A stabilizer system for improving the resistance of poly 1-olefins prepared from 1-olefin monomers having 2–8 carbon atoms therein to deterioration in physical properties on exposure to light and heat comprising an organic phosphite ester selected from the group consisting of dioctylphosphite and tri-phenyl phosphite; a thioester selected from the group consisting of dilaurylthiodipropionate and distearylthiodipropionate; 2,6-di-tert-butyl-4-methylphenol; and 4,6-di(4-hydroxy-3,5 - di - tert - butyl-phenoxy)-2-octylthio-1,3,5-triazine.

5. A composition of matter having improved resistance to discoloration and embrittlement on aging and heating comprising poly 1-olefins prepared from 1-olefin monomers having 2–8 carbon atoms in combination with a stabilizer system comprising an organic phosphite ester characterized by the following formula:

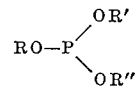

wherein R is a hydrocarbon radical selected from the group consisting of alkyl, aryl, cycloalkyl, and combinations thereof having 1 to 20 carbon atoms, and R' and R" are selected from the group consisting of R and hydrogen; a thioester characterized by the formula:

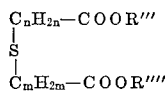

wherein R''' and R'''' are alkyl groups selected from those containing 6 to 24 carbon atoms, and $n$ and $m$ are integers from 1 to 6; 2,6-di-tert-butyl-4-methylphenol; and 4,6-di(4-hydroxy-3,5-di-tert-butylphenoxy) - 2 - octylthio-1,3,5-triazine.

6. A composition according to claim 8 further characterized in that the polymer is polypropylene in combination with a stabilizer system wherein the 2,6-di-tert-butyl-4-methylphenol and 4,6-di(4-hydroxy-3,5 - di - tert-butylphenoxy)-2-octylthio-1,3,5-triazine are each present in a range from about 0.025 to about 0.5 part by weight per 100 parts of polymer (php.), the organic phosphite ester is present in the range from about 0.05 to about 1.25 php., and the thioester is present in the range from about 0.05 to about 1.25 php.

7. A composition according to claim 6 wherein the amount of the phenol is from about 0.40 php. to about 0.04 php., the amount of the triazine is 0.40 php. to 0.04 php., the amount of the thioester is 0.3 php. and the amount of the phosphite is 0.1 php.

8. A composition according to claim 10 further characterized in that the organic phosphite ester is dioctyl phosphite and the thioester is dilaurylthiodipropionate.

9. A composition according to claim 7 wherein the thioester is distearylthiodipropionate and the organic phosphite ester is triphenylphosphite.

10. A composition according to claim 9 wherein the said stabilizer combination is present in the range from about 0.15 to 3.50 parts by weight of the stabilizer composition per 100 parts of polypropylene.

11. A composition of matter having improved resistance to discoloration and embrittlement on aging and heating comprising a poly 1-olefin prepared from 1-olefin monomers having 2–8 carbon atoms comprising an organic phosphite ester selected from the group consisting of dioctyl phosphite and triphenyl phosphite; a thioester selected from the group consisting of dilaurylthiodipropionate and distearylthiodipropionate; 2,6 - di - tert - butyl-4-methylphenol; and 4,6-di(4-hydroxy-3,5-di-tert-butylphenoxy)-2-octylthio-1,3,5-triazine.

12. A composition of matter in accordance with claim 11 wherein the poly 1-olefin is polypropylene, and wherein 2,6-di-tert-butyl-4-methylphenol and 4,6 - di(4-hydroxy-3,5-di-tert-butylphenoxy) - 2 - octylthio - 1,3,5 - triazine are each present in the range from about 0.025 to about 0.5 part by weight per 100 parts of polymer (php.) and are present in the range of the ratio of 90:10 to 10:90 parts by weight with respect to each other, and the organic phosphite and thioester are each present in the range from about 0.05 to about 1.25 php.

References Cited

UNITED STATES PATENTS 3,103,501 9/1963 Shearer et al. _____ 260—45.95
3,335,108 8/1967 Pines _____ 260—45.8

FOREIGN PATENTS 945,441 12/1963 Great Britain _____ 260—45.85

HOSEA E. TAYLOR, Primary Examiner

M. J. WELSH, Assistant Examiner

U.S. Cl. X.R.

252—402

UNITED STATES PATENT OFFICE

CERTIFICATE OF CORRECTION

Patent No. 3,636,031                                              Dated: January 18, 1972

W. O. Drake et al

It is certified that error appears in the above-identified patent and that said Letters Patent are hereby corrected as shown below:

Column 2, line 40, delete "3,258,418" and insert --- 3,349,058 ---; Column 7, line 12, delete "8" and insert --- 5 ---; Column 7, line 27, delete "10" and insert --- 7 ---.

Signed and sealed this 5th day of December 1972.

(SEAL)
Attest:

EDWARD M. FLETCHER, JR.
Attesting Officer

ROBERT GOTTSCHALK
Commissioner of Patents